Figure 1:
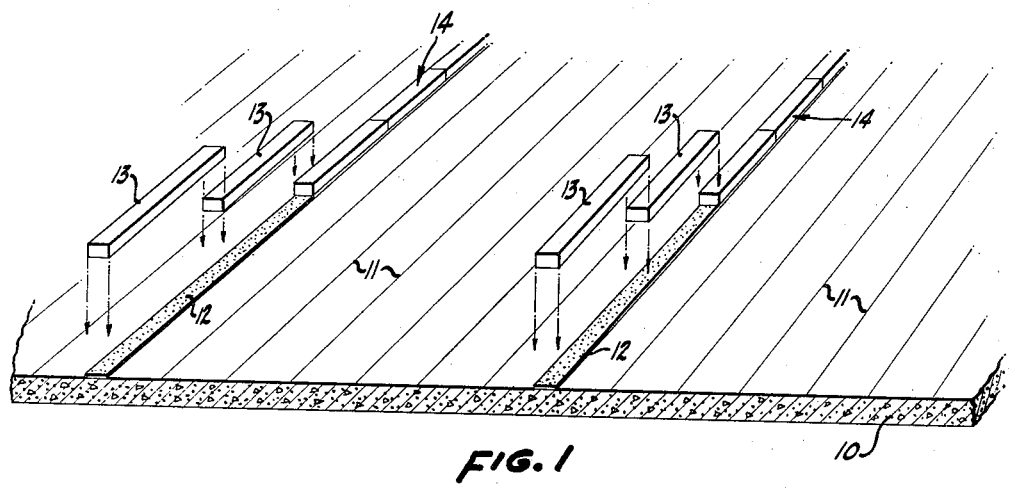

Oct. 2, 1956  C. LE R. OLSON  2,764,888
PRECAST SLEEPER CONSTRUCTION
Filed Jan. 15, 1953

INVENTOR
CLARENCE LEROY OLSON
BY Edward B. Legg
ATTORNEY

United States Patent Office 2,764,888
Patented Oct. 2, 1956

2,764,888

PRECAST SLEEPER CONSTRUCTION

Clarence Le Roy Olson, San Francisco, Calif.

Application January 15, 1953, Serial No. 331,364

4 Claims. (Cl. 72—101)

This invention relates to a precast sleeper construction of the type wherein rot proof sleepers of mineral character are bonded to an underlying concrete slab, such sleepers being nail-penetrable so that a wood flooring can be nailed thereto.

Sleepers are extensively used in connection with floorings wherein the base is a concrete slab. In such construction it is conventional to provide a concrete slab, to affix sleepers thereto in spaced, parallel arrangement, and to nail a wood flooring to the sleepers. Such sleepers may be of wood construction suitably bolted or otherwise affixed to concrete slabs. Wood sleepers, however, are disadvantageous for several reasons. Thus, they are combustible and are subject to the ravages of termites and dry rot.

For these and other reasons, so-called "concrete," "cement" or "composition" sleepers of a mineral character are used extensively. Such sleepers shall be referred to hereinafter as "concrete sleepers."

Concrete sleepers are not combustible and are termite and rot proof. For the purpose described, the composition of concrete sleepers must be such that, when it has set and cured, it will have adequate strength for the load to be imposed upon it. It is also necessary that the sleepers be securely fixed to the underlying slab and that they be penetrable by nails. The sleepers must have a satisfactory nail-holding power so that a wood flooring nailed to the sleepers will be held securely.

Compositions of this character are well known and require no detailed description herein. Typical compositions are set forth in the following patents: Smallman, 1,651,076; Wires, 1,860,917; Atterbury, 1,163,060, and Taylor, 1,302,452. The Atterbury and Taylor patents describe concrete compositions in which the cementing agent is Portland cement, whereas Smallman and Wires relate to so-called magnesite or Sorel cements wherein the cementing agent is a mixture of magnesium oxide and magnesium chloride. In a typical composition of this type, magnesia in a suitably comminuted state and a suitable filler material or aggregate such as silica or limestone dust are mixed with sawdust, wood fiber or asbestos. To this mixture, just prior to casting the sleeper, is added a magnesium chloride solution, usually about a 22° Bé. solution. A reaction ensues between the magnesium chloride, magnesia and water. The cement is of the hydraulic type. The wet mortar sets rapidly and, in the course of time, cures to provide a monolithic mass which has the necessary strength to support a wood flooring, which bonds satisfactorily to a variety of materials including slabs of ordinary Portland cement concrete, which is nail-penetrable and which has a satisfactory nail-holding power.

Heretofore, owing to certain difficulties in the use of precast sleepers, it has been the practice to cast such sleepers in situ. This practice provides a satisfactory sleeper construction but, for various reasons, it is cumbersome and leaves much to be desired. Thus, this type of operation (i. e., casting in situ) requires the use of relatively expensive and very heavy steel forms. The forms must be supplied to the job and must be laid out and leveled. After the mortar has been poured in and struck off flush with the tops of the forms, and after the cast sleepers have set, the forms must be removed. The forms must then be cleaned and oiled, then transported to the next job, or to a central storage place if there happens to be no job requiring them at the time. The single item of cost of transporting forms to and from a job is itself a substantial factor. Also, this practice requires that a construction crew be provided at each and every job who are skilled in handling the forms, the preparation of the mortar, the casting and finishing operations and removal of the forms without damage to the sleepers.

The employment of precast sleepers is an attractive alternative to casting sleepers in place. Thus, precast sleeper sections can be made at a central plant with proper equipment and by a skilled crew of workmen. The sleeper sections can be finished to precise dimensions, tied together in bundles and delivered to a job in predetermined lengths. Whenever it is necessary to employ a short sleeper section, e. g. at the end of a string of sleepers, it is a simple task to cut or saw a sleeper section of predetermined length to the required shorter length.

Notwithstanding these apparent advantages the employment of precast sleepers has been retarded for certain very practical reasons. As has been mentioned above, nail penetrability is an important property of sleepers of the character referred to. Of course, precast nail-penetrable sleepers offer no problem per se. However precast sleepers must be securely bonded to the underlying slab. Frequently there is unevenness in the top surface of a concrete slab, with the result that the layer of cement bonding the precast sleeper to the slab must be of varying thickness. If this layer of bonding cement of varying thickness is not nail-penetrable, difficulties will be encountered in nailing a wood flooring to the sleepers. Thus, where a relatively thin layer of bonding cement is interposed between the under surface of a sleeper and the upper surface of the concrete slab, and if this layer of bonding cement is not nail-penetrable, difficulty will be encountered in driving a nail into the sleeper at such location.

Another difficulty arising from the uneven character of concrete slabs is the necessity of providing sleepers of varying thickness. Thus, because there are low spots, high spots and intermediate areas on slabs, it is present practice to provide extra thick sleepers, extra thin sleepers and sleepers of average thickness.

It is also desirable to provide a suitable bonding cement which is not only nail-penetrable but which will serve to bond the precast sleepers securely to the concrete slab and which will set rapidly.

Another difficulty encountered in the employment of precast sleepers is the fact that the top surfaces of concrete slabs vary in texture. Thus, one slab may have a smooth surface whereas another slab may have a very rough surface. It is more difficult to bond a sleeper securely to a smooth slab than to a rough slab.

It is an object of the present invention to provide improved means of laying sleepers on and bonding them to concrete slabs and the like.

It is a further object to provide an improved method of laying precast sleepers on and bonding them to a concrete slab.

It is a particular object of the invention to provide an improved method whereby precast, nail-penetrable concrete sleepers can be securely bonded to either rough or smooth concrete slabs having an uneven surface and whereby the finished job will present an upper slab surface lying in a predetermined horizontal plane.

Yet another object is to provide a cementing composition which is adapted to cement and bond precast sleepers securely to concrete slabs.

Another object is to provide a means of applying precast concrete sleepers to uneven slabs without the necessity of employing more than one size of sleeper.

Yet another and particular object is to provide a cementing or bonding composition which will securely and firmly bond nail-penetrable concrete sleepers to a concrete slab and which, upon setting, is itself nail-penetrable.

These and other objects of the invention will be apparent from the ensuing description and the appended claims.

Figure 2:
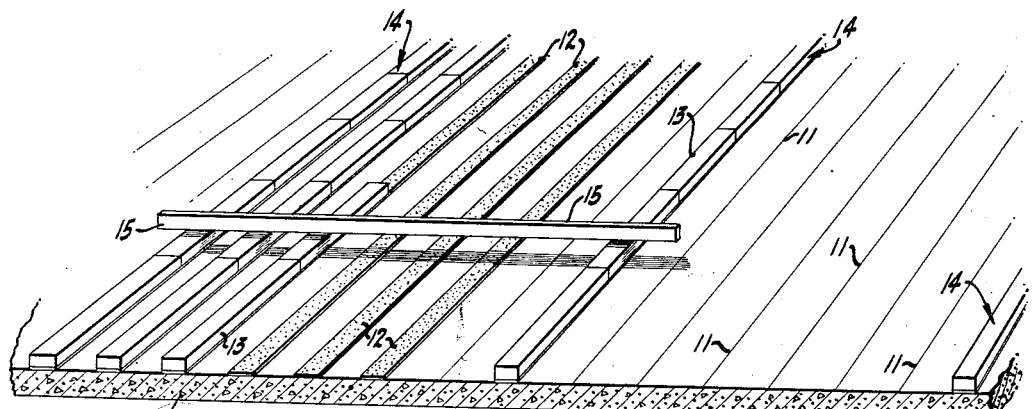
Figure 3:
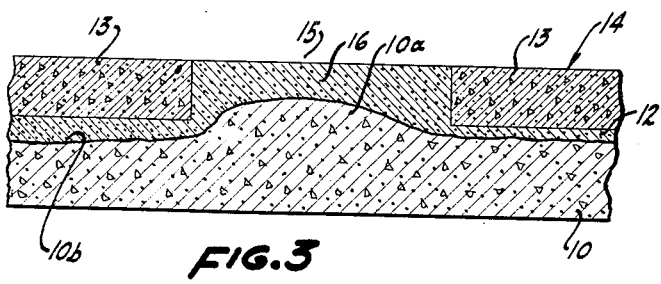

One form of the invention is illustrated by way of example in the accompanying drawing in which, Figure 1 is a perspective view of a concrete slab illustrating the initial stages in the laying of sleepers in accordance with the invention, Figure 2 is a similar view showing the final stages of laying sleepers in accordance with the invention, and Figure 3 is a fragmentary, longitudinal section taken through a sleeper showing one way in which the cementing agent of the invention is also used as a filler.

In accordance with the present invention, I provide precast sleepers of suitable composition, which are of mineral character, which are nail-penetrable and which are rot-proof. I then prepare the surface of the slab in the manner more fully described hereinafter. I then apply to the slab strips of a suitable nail-penetrable cement, such cement being capable, upon setting and curing, of bonding the sleepers to the slab. In carrying out this application of cement, I observe certain precautions and follow a certain technique as more fully set forth hereinafter. I then lay the precast sleepers over the cement in end-to-end relation and allow the same to set and cure.

The sleepers used in accordance with the present invention may be of any suitable composition and construction, e. g., a dry mix may be provided consisting of 25% magnesia, 12% coarse sawdust, 26% limestone dust and 37% white sand, such percentages being by weight. To this dry mix is added 22° Bé. aqueous magnesium chloride solution in quantity sufficient to provide a plastic mass which can be troweled. Sleepers may be made from the resultant wet mix by any desired method. Preferably an apparatus and a method are employed which are described and claimed in my co-pending application Serial No. 291,195, filed June 2, 1952, entitled "Method and Apparatus for Forming Cementitious Slabs."

As described in the aforesaid co-pending patent application, the wet mix is placed in a steel form lined with wax paper and having upright sides and ends. The depth of this form is substantially the desired thickness of the sleeper. The ends of the form are formed with slots spaced apart the width of the sleepers. Thus, the form may have an overall width five times the width of a sleeper, and the ends slotted at appropriate intervals.

The form is then placed in a press and the slab contained therein is subjected to simultaneous compression and agitation to compact it. Then the form is passed underneath a set of rotary knives or blades which are in registry with the slots formed in the ends of the form. The rotary knives are preferably set to clear the bottom of the form by a small fraction of an inch. A single pass under the rotary knives suffices to cut the slab into several, e. g., five, individual sleeper sections which, however, are joined at the bottom by a thickness of cement corresponding to the knife clearance.

An inverted steel channel of substantially the same width as the form is then provided and is covered with wax paper. The form is up-ended and the slab within is dumped onto the channel. The wax paper used for lining the form is removed and the channel with the fresh slab is placed on a rack to allow the slab to set and cure.

The set slabs are then removed and stacked. When ready for use, the individual sleepers are easily detached by hand; i. e., one sleeper breaks away from the adjoining sleeper because of the very small thickness of cement joining them.

It will be apparent that the apparatus and technique thus employed to manufacture sleepers lends itself to speedy operation and high production rates, and that the sleepers are of uniform size and configuration. However, such apparatus and technique require use at a central plant rather than on the job, to operate efficiently. It will, therefore, be apparent that apparatus and technique are available to manufacture precast sleepers economically.

The precast sleepers so constructed may be of any suitable length, width and thickness, e. g., 5 ft. in length, 2¼ inches in width and 1⅜ inches in thickness.

The cement employed in accordance with the present invention may be any nail-penetrable cement which will bond to the precast sleepers and to concrete slabs and which is rot-proof. Preferably an oxy-chloride type of cement is employed in which the filler is of a nature such that the cement, after setting and curing, is nail-penetrable. An example of a dry mix employed to prepare the preferred cement is as follows:

| | Percent by wt. |
|---|---|
| MgO | 25 |
| Coarse sawdust | 12 |
| Limestone dust | 26 |
| Minus 30-mesh Del Monte (California) white sand | 37 |
| Total | 100 |

In place of magnesium oxide other materials such as Portland cement may be used and in place of sawdust other fillers such as asbestos may be used. In place of limestone dust, marble dust or silica may be used. In place of Del Monte sand, other aggregates such as cinders may be used.

A dry mix of this character is delivered to the job in any convenient form, e. g., in 100 lb. bags. Just prior to application, it is mixed with an aqueous solution of magnesium chloride, preferably a 22° Bé. solution, in quantity sufficient to produce a plastic mass of about the consistency of pancake batter. Alternatively, a complete dry mix may be employed including the magnesium chloride component. In such case the magnesium chloride component may have been pretreated to provide it with a protective coating, such as that described in my co-pending patent application Serial No. 319,003, entitled "Coated Hygroscopic Material and Method of Making Same," filed November 6, 1952. Whenever a complete dry mix of this character is employed, water instead of the magnesium chloride solution will be employed, being added to the complete dry mix just prior to its utilization. Instead of a magnesium oxy-chloride type of cement, a Portland cement type may be used, in which Portland cement is used in place of magnesia and a dilute aqueous calcium chloride solution is used in place of magnesium chloride solution.

The slab is prepared as follows: In new construction it is preferably to specify that the slab shall have a rough textured surface, which can be achieved by rodding, grooming or floating. Such a roughened surface provides a better bond between the cement and the slab. However, the method and material of my invention are applicable to a smooth slab as will appear more fully hereinafter. The slab is suitably cleaned and freed of all foreign matter. Then chalk lines are snapped on to the slab at predetermined centers, e. g., 16 inches apart. If the slab has a roughened surface, it is preferable to brush a suitable grout along the chalk lines and approximately the width of the sleepers. A suitable grout can be prepared with a mixture of one part by weight of seawater magnesia and one part by weight of white marble dust or limestone dust. Immediately prior to the application of the grout, a 22° Bé. aqueous magnesium chloride solution is added to and mixed with the dry grout mixture, in quantity sufficient to produce a mortar of approximately the consistency of pancake batter. The cement should be applied to the grouted surface and the sleepers set in place before the grout hardens. The grout ensures a good bond between the slab and the cement.

Should the slab be smooth it may be roughened along the chalk lines by any suitable means and then grouted as described above. Alternatively, nails may be driven in and their heads allowed to project above the surface of the slab. For example, ¾" concrete stub nails may be driven into the slab 4" apart, and their heads allowed to protrude approximately ¼" above the slab. Alternatively "Olson Masti-Dek" or "Olson Bond Grip" may be applied along the chalk lines and allowed to harden before application of the cement. Olson Masti-Dek and Olson Bond Grip are trademarks of LeRoy Olson Company, San Francisco, which are applied, respectively, to a black or colored, coarse-grained adhesive, and to the same product containing Portland cement.

When the slab has been thus prepared, a nail-penetrable cement capable of bonding to the sleepers on the one hand, and to the treated slab on the other hand, is employed. In this connection it is usually necessary to lay the sleeper sections so that their upper surfaces are at a predetermined height above the slab. Assuming, for example, that the slab is perfectly level, that the upper surface of the sleepers is to be 1¾" above the slab and that the sleepers are 1⅜" thick, it will be apparent that a layer of cement ⅜" thick will be required.

Referring now to Figure 1 of the drawing, a concrete slab is shown at 10. This slab will have been swept clean, chalk lines 11 are snapped on at predetermined centers, e. g., 16 inches apart, and the surface along each chalk line will be suitably roughened, if necessary (or nails will be driven in). In Figure 1 the preliminary stage of laying sleepers is shown. Thus, along each eighth chalk line the surface of the slab will be grouted or otherwise treated as hereinabove described, to promote a secure bond to the slab. Then along each such eighth chalk line, a strip of nail-penetrable bonding cement will be applied. Two such strips of cement are shown in Figure 1 and are indicated as 12. Individual precast sleeper sections 13 are laid end-to-end along each such strip of cement. To properly gauge the thickness of the cement strips 13, a water level or engineers' level may be employed, and a long straight edge may then be laid along the string 14 of sleeper sections. Alternatively, soft stools of the cement (not shown) may be laid along the side of each eighth sleeper at five or ten foot intervals and levelled, with the aid of a water level or engineers' level, at the predetermined height of the sleepers. Such stools will serve as a gauge in levelling the sleepers. Excess cement will be struck from each eighth sleeper, as it is laid and levelled, and this excess cement can be gathered up and used for the next sleeper.

Referring now to Figure 2, on the following day, or as soon as the cement has set sufficiently, the intervening sleepers 14 are similarly laid along the intervening chalk lines 11, after suitable preparation with grout or otherwise. In this final stage, leveling of the intermediate sleepers can be accomplished very simply by means of a long straight edge such as that shown at 15. The straight edge 15 is laid across the previously laid sleepers, which therefore act as gauges for leveling the great majority of sleepers.

In all cases, of course, when a sleeper is laid and set to level, and before the cement sets, excess cement will be struck from the sides of the sleeper and used again. Thus it may be gathered up and mixed with fresh cement.

The conditions assumed above are ideal and are not frequently encountered in practice. Thus, seldom are concrete slabs perfectly level. Almost always they are uneven and in many cases the unevenness is substantial. In this connection an important advantage of the technique and the composition of the present invention is apparent. The composition of the invention is referred to for convenience as a "cement." However, it serves not only as a cementing or bonding medium to bond sleepers to a slab, but also serves as a filler to accommodate variations in level of the slab. Thus, in general where there are depressions or low spots in a slab, a greater quantity of cement will be used to fill such low places. Conversely, where there are high places in the slab, correspondingly less cement will be used.

In this connection it should be noted that the chief advantage of the present invention is that it provides a more practical means of employing precast sleepers. In the event that the surface of a slab is highly irregular or uneven and includes excessively high spots or humps and excessively low spots, it has been the previous practice to employ extra thin sleepers (to cover high spots), extra thick sleepers (to cover low spots) and sleepers of intermediate thickness for portions of the slab which are at an average or intermediate level. Accordingly, and as illustrated in Figure 3, a variation of the technique described above is employed. Referring now to Figure 3, a portion of a slab 10 is shown in cross section which includes a high spot or an exceptionally high convex irregularity at 10a, and a low spot or exceptionally concave irregularity at 10b. As illustrated in Figure 3 the sleeper sections 13 adjacent the high spot 10a are spaced apart to provide a gap 15 therebetween. This gap is filled with the cement or filler material of the present invention, which is struck off so as to be flush with the upper surface and sides of the adjacent sleeper sections 13. A filler segment 16 of nail-penetrable cement is thus provided. By this means, continuity of the sleeper 14 is preserved, only a small amount of cement is needed for the purpose, the filler segment 16 is securely bonded to the slab and to the adjacent ends of the sleeper sections 13, and this segment is nail-penetrable. As is also shown in Figure 3, the cement is employed as a filler for a low spot such as that shown at 10b. It will, therefore, be apparent that only one size of sleeper is necessary.

Among other variants which may be mentioned are the following: The technique and materials of the present invention may be applied to old or new slabs. As stated, the slab is preferably provided with a roughened surface, and where the present invention is applied in new construction, the supplier should specify that the surface of slab be prepared rough, e. g., with a rodded or floated finish. The technique and materials of the present invention are applicable where sleeper sections are laid in end-to-end, abutting relation and also where they are spaced apart at their ends for purposes of ventilation. The invention is also applicable where the spaces between the rows of sleepers are filled in solid with concrete, e. g., where fire hazards, a fire ordinance or heavy loading of the floor so requires. In such a case it is preferable to apply a seal coat of asphalt to the entire surface of the sleepers (tops and sides), before filling the spaces between sleepers. The present invention is equally applicable to so-called "spring" floors, such as used in dance halls, gymnasiums and play rooms, and to more solid floors lacking the quality of springiness.

I claim:

1. A method of sleeper construction wherein a plurality of rot-proof concrete sleepers are affixed to a concrete slab or the like at spaced intervals along predetermined centers, said method comprising, as an initial step, applying to said slab along a minor portion of said predetermined centers strips of cement capable of setting to provide a hard, non-plastic nail-penetrable, rot-proof bond between the slab and the sleepers, such initial step leaving a majority of intermediate, uncemented predetermined centers; laying sleeper sections in end-to-end relation along such cemented strips, bringing such sleeper sections to a predetermined level and allowing the cement to set; then, as a subsequent step, similarly applying cement and sleepers along said intermediate centers, meanwhile employing the previously laid sleepers as gauges to level the subsequently laid sleepers.

2. A method of sleeper construction comprising providing a nail-impenetrable concrete slab, applying thereto a plurality of guide lines at spaced intervals along predetermined centers, applying to the slab along a minor portion of said guide lines strips of nail-penetrable, rot-proof cement capable of setting to a hard, non-plastic mass and of bonding to the slab and to nail-penetrable concrete sleepers, such application being carried out so as to leave a majority of intermediate guide lines uncemented, providing a plurality of individual concrete, rot-proof sleeper sections each of relatively short length compared to the length of an entire sleeper, laying such sleeper sections in end-to-end relation along the cemented strips, leveling the sleepers to a predetermined level and allowing the cement to set; then similarly treating the slab along said intermediate guide lines with such cement, laying the remainder of the sleeper sections along the resulting cemented strips, and employing the previously laid sleepers as gauges to level the subsequently laid sleepers.

3. In the method of sleeper construction wherein nail-penetrable concrete sleepers are bonded to a nail-impenetrable concrete slab in spaced, parallel arrangement along predetermined centers, such slab having a non-uniform surface including low spots, the improvement which comprises: applying guide lines to the slab along said predetermined centers, applying to a minor portion of said guide lines strips of nail-penetrable, rot-proof cement capable of setting to a hard, non-plastic mass and of bonding to the slab and to the sleepers, such application being carried out to leave a majority of uncemented intermediate guide lines, providing a plurality of individual sleeper sections of nail-penetrable, concrete composition, laying such sleeper sections in end-to-end relation along the cemented strips, leveling such sleeper sections, employing said cement as a filler for said low spots, and allowing the cement to set; then similarly applying strips of said cement to the slab along said intermediate guide lines and laying such sleeper sections thereon, meanwhile employing the previously laid sleepers as gauges to level the subsequently laid intermediate sleepers.

4. A method of sleeper construction wherein sleepers are affixed to a nail-impenetrable concrete slab having an irregular surface including low spots and high spots, such method comprising: applying to the slab spaced, parallel guide lines along predetermined centers, applying to a minor portion of said guide lines a nail-penetrable, rot-proof cement capable of setting to a hard, non-plastic mass and of bonding to the slab and to concrete, nail-penetrable sleepers, meanwhile leaving a majority of uncemented intermediate guide lines, applying individual sleeper sections to the strips of cement, providing a supply of nail-penetrable, rot-proof concrete sleeper sections, applying such sleeper sections to the cemented strips in end-to-end relation to provide a plurality of continuous sleepers, bringing such sleepers to a predetermined level and employing such cement to fill low spots, to cover high spots and to provide an average thickness of cement, spacing such sleeper sections apart at excessively high spots exceeding the average thickness of cement to provide gaps in registry with such excessively high spots, employing said cement as a filler for such gaps to provide continuity of sleepers, and allowing the cement to set; and then similarly applying cement and sleeper sections to the slab along said intermediate guide lines, meanwhile employing the previously laid sleepers as gauges to bring the subsequently laid sleeper sections to said predetermined level.

References Cited in the file of this patent

UNITED STATES PATENTS

| | | |
|---|---|---|
| 1,163,060 | Atterbury | Dec. 7, 1915 |
| 1,302,452 | Taylor | Apr. 29, 1919 |
| 1,651,072 | Smallman | Nov. 29, 1927 |
| 1,820,041 | Barrows | Aug. 25, 1931 |
| 1,917,930 | Fischer | July 11, 1933 |
| 2,092,694 | Crooks | Sept. 7, 1937 |
| 2,301,187 | Balhatchet | Nov. 10, 1942 |

FOREIGN PATENTS

| | | |
|---|---|---|
| 646,878 | Great Britain | Nov. 29, 1950 |